Patented May 17, 1949

2,470,497

UNITED STATES PATENT OFFICE 2,470,497

PREPARATION OF POLYSILOXANE RESINS

Harry F. Lamoreaux, Ballston Lake, N. Y., assignor to General Electric Company, a corporation of New York No Drawing. Application November 21, 1945, Serial No. 630,134

10 Claims. (Cl. 260—46.5)

The present invention relates to a method of preparing polysiloxane resins. It is particularly concerned with an improved process of hydrolyzing resin-forming mixtures of chlorosilanes having a hydrocarbon-to-silicon ratio less than about 1.5 and including a major portion of methylchlorosilanes to form improved polysiloxane resins.

It is well known that organohalogenosilanes, or mixtures thereof which may also contain some silicon tetrahalides, readily hydrolyze when mixed with water to form silanols which condense or can be caused to condense to form polysiloxanes. The ease with which the silanols condense is dependent on the nature of the organic radical or radicals. When all or substantially all of these radicals are methyl groups the rate of dehydration or condensation is so rapid that for all practical purposes the condensation of the silanols occurs simultaneously with the hydrolysis of the chlorosilanes. Because both reactions occur almost instantaneously, the hydrolysis of methylchlorosilanes containing a sufficient number of chlorine atoms attached to silicon to form heat-hardenable products by mixing them with water results in the formation of insoluble gels which cannot be used in the manufacture of useful resinous compositions, or in the formation of products of low average molecular weight, rather than the high average molecular weight products sought in the preparation of resinous products in general.

Various methods have been devised for controlling the hydrolysis reaction and, to some extent, the condensation reaction with the general objects of preventing gel formation and improving the hardness, cure time and other properties of the products. For example, the chlorosilanes have been dissolved in ether and the resultant solution added to ice or a mixture of ice and water. Another process described and claimed in the copending application S. N. 455,617 (now U. S. Patent 2,398,672, issued April 16, 1946), filed August 21, 1942 in the name of Robert O. Sauer and assigned to the same assignee as the present invention comprises the solution of the chlorosilanes in a solvent such as toluene and the addition of this solution to a mixture comprising water and a higher alcohol such as butanol. Although these methods result in the formation of liquid, heat-hardenable products, they have also involved certain disadvantages. Large volumes of solvents were usually necessary and in some cases the resinous products possessed poor craze resistance. Certain of the methods did not lend themselves either to the easy separation of the solvents or to the recovery of the hydrogen chloride by-product, both of which are essential in any large scale commercial project.

An object of the present invention is to provide a method of hydrolysis whereby soluble polysiloxane resins of improved hardness and stability can be obtained.

Another object of the invention is to provide a method of hydrolysis whereby soluble methyl polysiloxane resins of improved hardness and stability can be obtained.

A further object of the invention is to provide a less expensive method of preparing methyl polysiloxane resins requiring smaller quantity of materials to produce a given weight of resin and permitting the recovery and reuse of the more expensive materials.

Another object of the invention is to provide a method of hydrolysis which eliminates the need for washing the hydrolysis products to remove residual hydrogen chloride.

I have discovered that the above and further objects which will become apparent from the following detailed description of the invention can be attained by employing a hydrolysis medium comprising a mixture of water, a high boiling hydrocarbon solvent and a high boiling solvent of the glycol ether type which is somewhat miscible with water and which is selected from the class of polyethers consisting of dioxane, bis-(beta-ethoxyethyl) ether, and ethylene glycol diethyl ether. The hydrolysis medium is maintained at a temperature above room temperature but not exceeding the boiling point of water, preferably at gentle reflux temperatures, during at least a major portion of the hydrolysis period. If desired the chlorosilane mixture may be dissolved in a portion of the hydrocarbon solvent or polyether and the resultant solution added to the hydrolysis medium.

The water immiscible hydrocarbon solvent employed in the practice of the present invention is preferably one having a boiling point substantially above the boiling point of the polyether component of the hydrolysis medium. Examples of suitable hydrocarbon solvents include mineral spirits, solvent naphtha, and the like.

The chlorosilane mixtures employed in the present invention are those containing major proportions of the methylchlorosilanes, methyltrichlorosilane forming a major portion of the methylchlorosilane component of the chlorosilane mixture. In addition to the methylchlorosilanes there may also be present various other alkyl chlorosilanes or aryl chlorosilanes such as ethyl, propyl, butyl, allyl, phenyl, etc., chlorosilanes. Small amounts of silicon tetrachloride may also be included, the overall organo-to-silicon ratio of the chlorosilane mixture being at least 1 and less than about 1.5. In general at least 75 per cent of the chlorosilanes will consist of methylchlorosilanes.

In carrying out the present invention a mixture of the high boiling hydrocarbon solvent, the water-miscible polyether and water in excess of that calculated as necessary for complete hydrolysis for the chlorosilane mixture is heated to reflux temperatures and the chlorosilane mixture or solution thereof in the polyether or the hydrocarbon solvent is slowly added to the hydrolysis medium. Hydrogen chloride gas of commercial purity is continuously given off during the additions of the chlorosilanes and may be recovered as a valuable by-product. After all of the chlorosilane mixture has been added, the temperature of the hydrolysis medium is increased to remove by fractional distillation any residual water, as well as the polyether component of the mass. To insure the complete removal of these two materials and all but a small amount of hydrochloride, the mass is ordinarily heated to a temperature equal to or just short of the boiling point of the hydrocarbon solvent.

The product remaining after removal of the water and polyether is a hydrocarbon solution of the polysiloxane resin which without further treatment can be employed in the various applications for which such polysiloxane resins are suited. The cured films of resins prepared in accordance with the present invention are characterized by a hardness, stability and toughness superior to previously known polysiloxane resins including those which have not been subjected to further treatment, such as that described and claimed in the copending application S. N. 455,615 (now U. S. Patent 2,389,477, issued Nov. 20, 1945) filed August 21, 1942 in the names of James G. E. Wright and James Marsden and assigned to the same assignee as the present invention.

In order that those skilled in the art better may understand how the present invention can be carried into effect, the following illustrative example is given:

*Example*

A mixture of 600 g. dioxane, 300 g. mineral spirits and 100 cc. water was placed in a glass container provided with a reflux condenser, a stirrer, a thermometer and a dropping funnel. The mixture was heated to gentle refluxing, after which a solution of 54 g. dimethyldichlorosilane, 486 g. methyltrichlorosilane and 300 g. dioxane was slowly added through the dropping funnel. During the addition of the chlorosilanes, hydrogen chloride gas was given off through the reflux condenser and could be recovered as such. After all of the chlorosilanes had been added the resultant mass was heated to a temperature of 140° C. for the purpose of distilling off the dioxane and any residual water. The resultant product was a mineral spirit solution of a polysiloxane resin which in the cured state was harder and tougher than known resins of the same methyl-to-silicon ratio. The resultant resin was also extremely heat-resistant.

Comparable resins can be obtained by substituting bis-(beta-ethoxyethyl) ether or ethylene glycol diethyl for the dioxane employed in the above example, the bis-(beta-ethoxyethyl) ether or dioxane being preferred from the standpoint of ease of separation by distillation of the polyether solvent from the hydrocarbon solvent solution of the resin.

By employing the process described herein, improved resins can also be obtained from mixtures of methyltrichlorosilane and dimethyldichlorosilane containing either or both of the corresponding mono- and di-phenyl, ethyl, butyl, etc., chlorosilanes in proportions such that the hydrocarbon-to-silicon ratio of the chlorosilane mixture is within the above-mentioned limits, preferably from 1.2 to 1.4 and the proportions of hydrocarbon groups R' other than the methyl groups is such that the R'/Me ratio, for example, the phenyl-to-methyl ratio, is from 0 to 0.6, preferably from 0.05 to 0.5. The presence of some phenylchlorosilanes appears to be particularly beneficial as their use permits a decrease of the over-all hydrocarbon-to-silicon ratio without sacrificing the toughness particularly characterizing the straight methyl polysiloxane resins of a methyl-to-silicon ratio of from about 1.3 to 1.4. Methyldichlorosilane, $CH_3SiHCl_2$, may also be substituted for all or part of the methyltrichlorosilane.

Although the process has been described with particular reference to the preparation of resins of a R/Si ratio of less than 1.5, it can also be employed in the hydrolysis of mixtures of methylchlorosilanes having higher methyl-to-silicon ratios. When used for the hydrolysis of methylchlorosilane mixtures having methyl-to-silicon ratios of about 1.8 or 1.9, relatively stable liquid polysiloxane products are obtained. This fact constitutes further proof that the products of the present process are different in kind from the known polysiloxane resins since the hydrolysis of such methylchlorosilane mixtures by previously known hydrolysis processes produces fairly unstable, heat-hardenable products.

What I claim as new and desire to secure by Letters Patent of the United States is:

1. The method of hydrolyzing a mixture of chlorosilanes containing a major portion of methylchlorosilanes, methyltrichlorosilane forming a major portion of the methylchlorosilane component of said mixture, the said mixture having a monovalent hydrocarbon-to-silicon ratio greater than 1.0 and less than 1.5, which method comprises slowly adding said chlorosilane mixture to a hydrolysis medium comprising a mixture of water in excess of that necessary for complete hydrolysis of said chlorosilane mixture, a high-boiling hydrocarbon solvent, and a solvent selected from the class consisting of dioxane, bis-(beta-ethoxyethyl) ether and ethylene glycol diethyl ether, and maintaining said hydrolysis medium at a temperature above room temperature but not exceeding the boiling point of water during at least a major portion of the hydrolysis period.

2. The method of hydrolyzing a mixture of chlorosilanes containing a major portion of methyltrichlorosilane, said mixture having a monovalent hydrocabon-to-silicon ratio greater than 1 and less than 1.5 which comprises slowly adding said chlorosilane mixture to a hydrolysis medium comprising a mixture of water in excess of that calculated as necessary for complete hydrolysis of the chlorosilane mixture, a hydrocarbon solvent, and a polyether selected from the class consisting of dioxane, bis (beta-ethoxyethyl) ether and ethylene glycol diethyl ether, while maintaining the hydrolysis medium under gentle reflux conditions during the time the chlorosilane mixture is being added thereto, the said hydrocarbon solvent having a boiling point substantially higher than the boiling point of the polyether component of the hydrolysis medium.

3. The method of hydrolyzing a mixture of chlorosilanes containing a major portion of methyltrichlorosilane and having a monovalent hydrocarbon-to-silicon ratio greater than 1 and less than 1.5 which comprises slowly adding the chlorosilane mixture to a hydrolysis medium comprising a mixture of water in excess of that calculated as necessary for complete hydrolysis of the chlorosilane mixture, mineral spirits, and an ether selected from the class consisting of dioxane, bis (beta-ethoxyethyl) ether and ethylene glycol diethyl ether, the said hydrolysis medium being maintained at a temperature above room temperature but not exceeding the boiling point of water during addition of said chlorosilane mixture.

4. The method of hydrolyzing a mixture of methylchlorosilane containing a major portion of methyltrichlorosilane and having a methyl-to-silicon ratio of from 1.2 to 1.4 which comprises slowly adding said chlorosilane mixture to a hydrolysis medium comprising a mixture of water in excess of that calculated as necessary for hydrolysis of said chlorosilanes, a polyether selected from the class consisting of dioxane, bis (beta-ethoxyethyl) ether and ethylene glycol diethyl ether, and a hydrocarbon solvent having a boiling point substantially higher than the boiling point of the polyether component of the hydrolysis medium and maintaining the temperature of said hydrolysis medium above room temperature but not exceeding the boiling point of water during a major portion of the hydrolysis period.

5. The method of hydrolyzing a mixture of dimethyldichlorosilane and a major portion of methyltrichlorosilane, said mixture having a methyl-to-silicon ratio of from 1.2 to 1.4 which comprises slowly adding said chlorosilane mixture to a hydrolysis medium comprising a mixture of water in excess of that necessary for complete hydrolysis of said chlorosilanes, mineral spirits, and a solvent selected from the class consisting of dioxane, bis (beta-ethoxyethyl) ether and ethylene glycol diethyl ether, and maintaining the hydrolysis medium under gentle reflux conditions at least during a major portion of the time during which the chlorosilane mixture is being added.

6. The method of hydrolyzing a mixture of methylchlorosilanes containing a major portion of methyltrichlorosilane and having a methyl-to-silicon ratio greater than 1 and less than 1.5 which comprises slowly adding said chlorosilane mixture to a hydrolysis medium maintained under refluxing conditions and consisting of a mixture of water in excess of that necessary for complete hydrolysis of said methylchlorosilanes, mineral spirits, and a polyether selected from the class consisting of dioxane, bis (beta-ethoxyethyl) ether and ethylene glycol diethyl ether.

7. The method of hydrolyzing a mixture of methylchlorosilanes containing a major portion of methyltrichlorosilane and having a methyl-to-silicon ratio greater than 1 and less than 1.5 which comprises slowly adding said chlorosilane mixture to a hydrolysis medium maintained under refluxing conditions and consisting of a mixture of mineral spirits, dioxane, and water in excess of that calculated as necessary for complete hydrolysis of said methylchlorosilanes.

8. The method of hydrolyzing a mixture of methylchlorosilanes containing a major portion of methyltrichlorosilane and having a methyl-to-silicon ratio greater than 1 and less than 1.5 which comprises slowly adding said chlorosilane mixture to a hydrolysis medium maintained under refluxing conditions and consisting of a mixture of mineral spirits, bis (beta-ethoxyethyl) ether, and water in excess of that calculated as necessary for complete hydrolysis of said methylchlorosilanes.

9. The method of hydrolyzing a mixture of methylchlorosilanes containing a major portion of methyltrichlorosilane and having a methyl-to-silicon ratio of from 1.2 to 1.4 which comprises slowly adding said chlorosilane mixture to a hydrolysis medium maintained under refluxing conditions and consisting of a mixture of mineral spirits, ethylene glycol diethyl ether, and water in excess of that calculated as necessary for complete hydrolysis of said methylchlorosilanes.

10. The method of hydrolyzing a mixture of chlorosilanes having a monovalent hydrocarbon-to-silicon ratio greater than 1.0 and less than 1.5 and containing as a component thereof a mixture of methylchlorosilanes including methyltrichlorosilane as a major portion of said component, which method comprises (1) forming a solution of said chlorosilane mixture in a polyether solvent selected from the class consisting of dioxane, bis-(beta-ethoxyethyl) ether and ethylene glycol diethyl ether, (2) slowly adding the aforesaid polyether solution of the chlorosilane mixture to a hydrolysis medium comprising a mixture of (a) water in excess of that necessary for complete hydrolysis of said chlorosilane mixture, (b) a high boiling hydrocarbon solvent, and (c) a polyether solvent of the class described above, the said addition being conducted while maintaining the hydrolysis medium at a temperature above room temperature but not exceeding the boiling point of water during at least a major portion of the time during which the chlorosilane mixture is being added to the hydrolysis medium.

HARRY F. LAMOREAUX.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,371,068 | Rochow | Mar. 6, 1945 |
| 2,375,998 | McGregor et al. | May 15, 1945 |
| 2,383,827 | Sprung | Aug. 28, 1945 |
| 2,389,477 | Wright et al. | Nov. 24, 1945 |
| 2,398,672 | Sauer | Apr. 16, 1946 |
| 2,405,041 | Mathes et al. | July 30, 1946 |
| 2,406,621 | Marsden | Aug. 27, 1946 |

OTHER REFERENCES

Carbide and Carbon Chemical Corp.: "Fine Chemicals," copyright 1939, pages 2, 26 and 27.

Mattiello: Protective and Decorative Coatings, vol. I, 1941, pp. 580, 638 and 639.